(12) United States Patent
Su et al.

(10) Patent No.: US 11,522,273 B2
(45) Date of Patent: Dec. 6, 2022

(54) ANTENNA FOR WEARABLE DEVICES

(71) Applicant: Google LLC, Mountain View, CA (US)

(72) Inventors: Wenjing Su, Mountain View, CA (US);
Jiang Zhu, Cupertino, CA (US);
Maura Aranguren, Sunnyvale, CA (US); Eric Dayringer, Sunnyvale, CA (US); Troy Edwards, Los Gatos, CA (US); Trevor Hermosillo, Santa Clara, CA (US); Matthew Egan, San Francisco, CA (US); Chi Kin Benjamin Leung, Sunnyvale, CA (US); Yao Ding, San Jose, CA (US)

(73) Assignee: Google LLC, Mountain View, CA (US)

( * ) Notice: Subject to any disclaimer, the term of this patent is extended or adjusted under 35 U.S.C. 154(b) by 122 days.

(21) Appl. No.: 16/130,411

(22) Filed: Sep. 13, 2018

(65) Prior Publication Data

US 2020/0091590 A1 Mar. 19, 2020

(51) Int. Cl.
*H01Q 1/12* (2006.01)
*H01Q 1/24* (2006.01)
*H04B 1/3827* (2015.01)
*H04M 1/03* (2006.01)
*H04R 5/033* (2006.01)

(52) U.S. Cl.
CPC .......... *H01Q 1/244* (2013.01); *H04B 1/3827* (2013.01); *H04M 1/03* (2013.01); *H04R 5/0335* (2013.01)

(58) Field of Classification Search
CPC .......... H01Q 1/244; H01Q 1/243; H01Q 7/00; H01Q 9/30; H04R 5/0335
See application file for complete search history.

(56) References Cited

U.S. PATENT DOCUMENTS

| 10,764,666 B1* | 9/2020 | Napoles | H01Q 9/42 |
| 2001/0040528 A1 | 11/2001 | Vaisanen et al. | |
| 2013/0214986 A1* | 8/2013 | Zhu | H01Q 1/243 |
| | | | 343/866 |
| 2018/0083342 A1* | 3/2018 | Lepe | H01Q 1/243 |
| 2018/0198192 A1 | 7/2018 | Wu et al. | |
| 2018/0254556 A1 | 9/2018 | Li et al. | |
| 2019/0109367 A1* | 4/2019 | Tseng | H01Q 1/241 |

FOREIGN PATENT DOCUMENTS

EP 3190805 A1 7/2017

OTHER PUBLICATIONS

International Search Report including the Written Opinion from Application No. PCT/US2019/049914 dated Dec. 13, 2019, 14 pages.
International Preliminary Report on Patentability for International Application No. PCT/US2019/049914 dated Mar. 25, 2021. 10 pages.

\* cited by examiner

*Primary Examiner* — Dieu Hien T Duong
(74) *Attorney, Agent, or Firm* — Colby Nipper PLLC

(57) ABSTRACT

An antenna is provided for a wearable personal computing device, such as an earbud. The antenna integrates with other components of the wearable device, such as an input control. For example, the antenna may at least partially surround a portion of a touchpad input at a surface of the device that is exposed when the device is worn. In one example, the antenna shares a ground plane with the touchpad. In another example, the antenna includes two nested traces, wherein a first trace is connected to ground and a second trace is connected to an antenna feed.

14 Claims, 8 Drawing Sheets

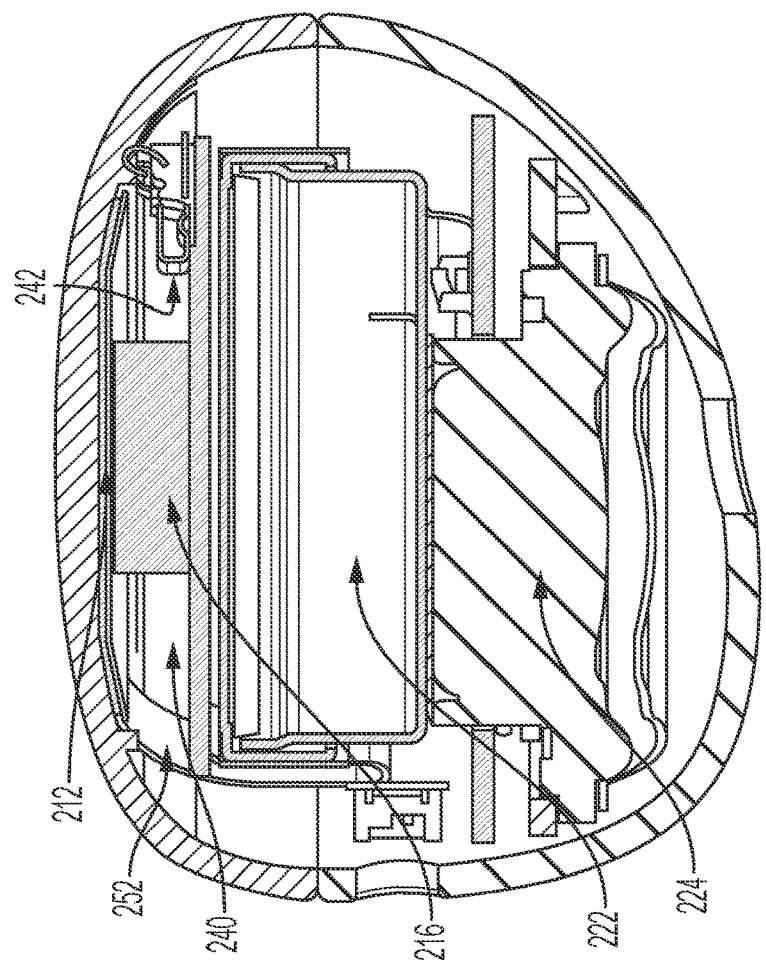
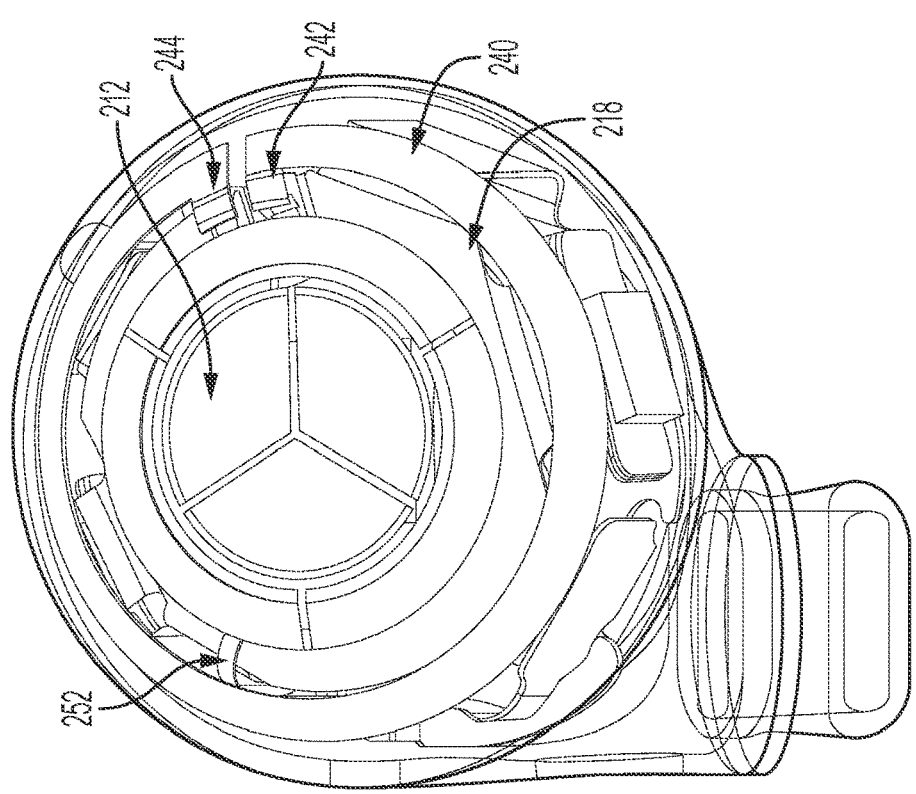
FIG. 3B
FIG. 3A

ANTENNA FOR WEARABLE DEVICES

BACKGROUND

Portable electronic devices include one or more antennas for transmitting and receiving signals in various communication bands. Antenna design for small electronic devices, such as wearable devices, can be very challenging because of the constrained form factors of such devices. For example, while a smart phone may have limited space for housing its antennas, earbuds with a compact form factor would necessarily have even less space. The limited space often impacts antenna performance, which may be measured by radiation efficiency and bandwidth. For example, antennas having a bigger size typically have a higher efficiency. Moreover, a physical clearance between the antenna and other components is small, which causes high radio frequency (RF) coupling between the antenna and other components, such as an input touchpad. The high RF coupling leads to antenna performance degradation and large variations of the antenna's performance due to the large tolerance of other components in assembly. Antenna performance for wearable devices may also be severely impacted by body effects due to the close proximity to the wearer, which may cause detuning, attenuation, and shadowing of the antenna.

Because of a trend of embedding earbuds deep into the ear and decreasing a total height for a better wearing experience, earbud antennas face additional challenges because of both sever body effects from proximity to the human head and smaller clearance to other components such as PCB, touchpad, and chips. The earbud antenna performance should also be able to cover variations due to various user experiences, for example, different size and shape of the ear, and different ways for people to install the earbud. The antenna design has to be robust enough to accommodate the above mentioned variations. To overcome the body effects, the antenna may be placed on a farthest location from the human body. However, five of the six faces of earbuds are covered by human tissue and only one face is fully exposed to free space, so moving the antenna away from the human body is difficult. Moreover, integrating the antenna with any other electronic structures, such as a touchpad that must also be at an exposed surface of the earbud, is very problematic.

BRIEF SUMMARY

The present disclosure provides for an antenna for a wearable computing device, such as an earbud. The antenna extends near a surface of the earbud that is exposed when the earbud is inserted into a user's ear. In a first example, the antenna extends substantially around a circumference of a touchpad. In another example, two antenna traces are arranged in a nested configuration. The nested traces may extend around a portion of the earbud, such as a touchpad. For example, the nested traces may extend around approximately ½, ⅔, ¾, etc. of the circumference of the earbud near the exposed surface.

One aspect of the disclosure provides an antenna, including an outer trace extending partially around a portion of a wearable electronic device, the outer trace having a first end configured to serve as a feed for the antenna, and an inner trace nested with the outer trace and extending partially around the portion of the wearable electronic device, the inner trace having a second end coupled to ground, wherein the first end of the outer trace is positioned opposite the second end of the inner trace. In some examples, the inner trace and the outer trace may each have an open end, the open end of the outer trace positioned adjacent the second end of the inner trace, and the open end of the inner trace positioned adjacent the first end of the outer trace. The inner trace and the outer trace may be quarter wavelength traces. In some examples, the inner trace and the outer trace may be circular, with an opening between the first end and the second end, the opening being between 90 degrees and 180 degrees. The electronic device in which the antenna is included may be an earbud, and when the earbud is positioned in a user's ear, the opening is oriented towards an upper back portion of the user's head. The inner trace and the outer trace may extend around a touchpad near a surface of the electronic device, and the touchpad may not be coupled to a ground plane. Where the electronic device is an earbud, the earbud may have an exposed surface when inserted in a user's ear, wherein the touchpad is positioned on the exposed surface, and the antenna is positioned near an edge of the exposed surface.

Another aspect of the disclosure provides a wearable electronic device, including a housing shaped to be worn on a human body, wherein at least one first surface of the housing is shaped to come in contact with the body and at least one second surface of the housing is shaped to be exposed when worn on the body. The wearable electronic device may further include an input control at the at least one second surface of the housing, and an antenna at the at least one second surface of the housing. The antenna may include an outer trace extending partially around the input control, the outer trace having a first end configured to serve as a feed for the antenna, and an inner trace nested with the outer trace and extending partially around the input control, the inner trace having a second end coupled to ground, wherein the first end of the outer trace is positioned opposite the second end of the inner trace. In some examples, the inner trace and the outer trace each have an open end, the open end of the outer trace positioned adjacent the second end of the inner trace, and the open end of the inner trace positioned adjacent the first end of the outer trace. The inner trace and the outer trace may be, for example, quarter wavelength traces. The input control may be circular and the inner trace and the outer trace may also be circular.

The wearable electronic device may further include an opening between the first end of the outer trace and the second end of the inner trace, the opening being between 90 degrees and 180 degrees. The wearable electronic device may be an earbud, and when the earbud is positioned in a user's ear, the opening may be oriented towards an upper back portion of the user's head. In some examples, the input control may be a touchpad, and the touchpad may not be coupled to a ground plane.

Yet another aspect of the disclosure provides a wearable electronic device, including a housing shaped to be worn on a human body, wherein at least one first surface of the housing is shaped to come in contact with the body and at least one second surface of the housing is shaped to be exposed when worn on the body. The wearable electronic device further includes an input control at the at least one second surface of the housing, the input control including a ground trace, and an antenna at the at least one second surface of the housing. The antenna may include a loop trace substantially surrounding the input control, the loop trace including a first end connected to an antenna feed and a second end connected to ground, and a coupling connecting the loop trace to the ground trace. The coupling may be positioned at a portion of the loop trace substantially opposite the first end and second end. The wearable electronic device may further include a ground plane for the input control, wherein the second end of the antenna is coupled to the ground plane.

BRIEF DESCRIPTION OF THE DRAWINGS

FIG. 3A is a perspective view of the first example antenna according to aspects of the disclosure.

FIG. 3B is a cross-sectional view of an example earbud including the first example antenna.

DETAILED DESCRIPTION

Overview

Figure 1:
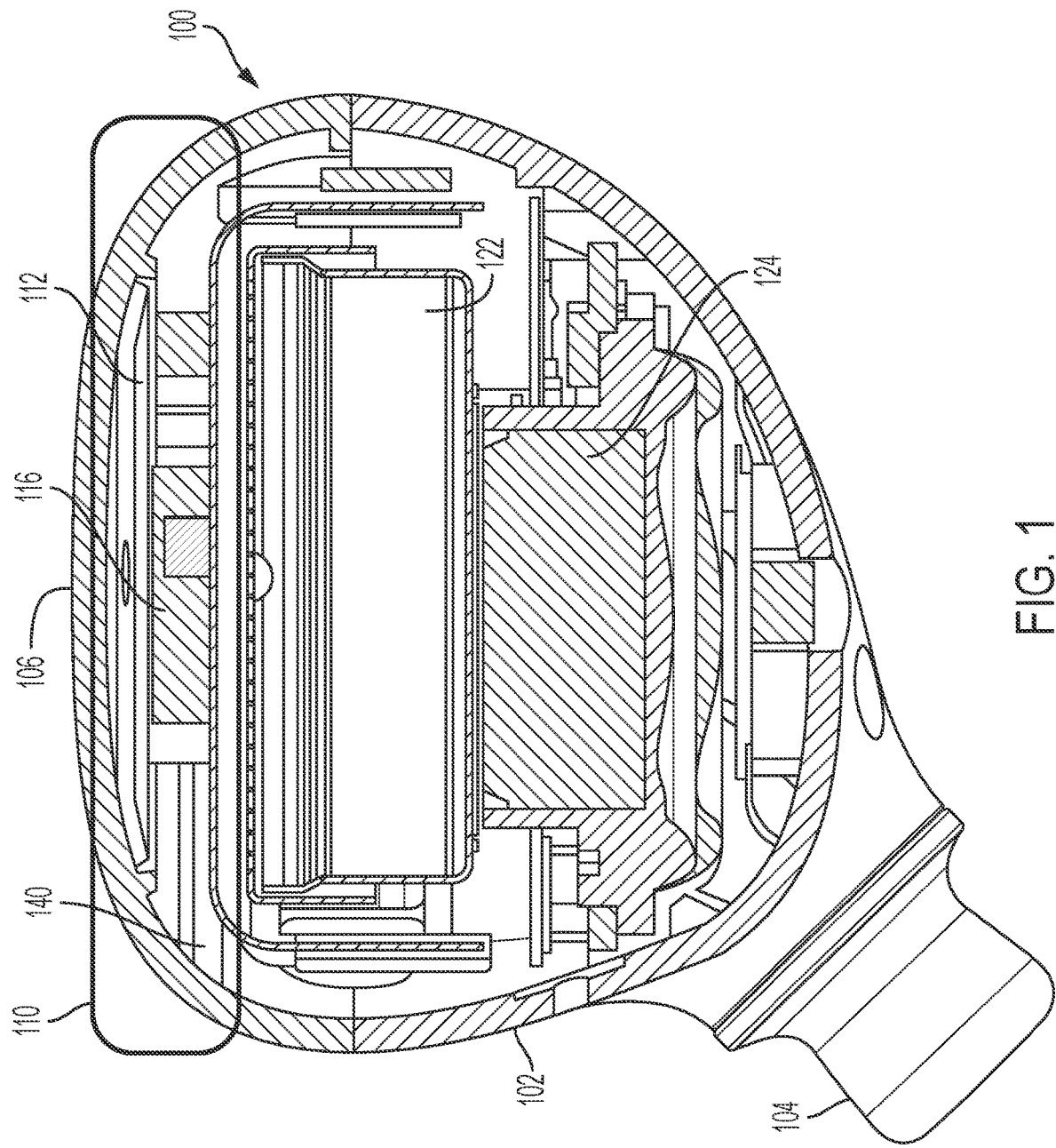
FIG. 1 is a cross sectional view of an example earbud including an antenna according to aspects of the disclosure.

The present disclosure provides examples of novel antennas for wearable devices, such as earbuds. In a first example, a half-wavelength circular loop trace extends substantially around an input control, such as a grounded circular touchpad. One end of the loop is the antenna feed, while the other end connects to ground. The end connecting to ground may be in relatively close proximity to the end that is the antenna feed, with just a short distance in between creating a loop opening. A rigid coupling connects the touchpad to a printed circuit board (PCB). The rigid coupling may be positioned in a location approximately opposite of the loop opening. Both the touchpad and the rigid coupling have a ground plane, which utilizes a cross pattern to reduce the coupling to the chip beneath so that it features a better tolerance, efficiency, and bandwidth.

The first example antenna may be positioned in a wearable device. For example, it may be positioned in an earbud near a surface that is exposed when the earbud is placed inside a human ear. The antenna may be oriented such that the loop opening is positioned towards a top portion of the user's ear. This arrangement of the antenna trace maximizes a separation distance between the antenna and the user's ear. This reduces the body effect, while allowing for a relatively large antenna size. It also largely avoids interference from a user's finger touching the earbud to provide input.

In a second example, two quarter-wavelength circular traces are positioned near an exposed surface of an electronic device, such as an earbud. The traces may extend around a portion of the device near an outer periphery. For example, the traces may be shapes to extend around a portion of the touchpad. The traces may be nested such that a first trace is an inner trace and a second trace is an outer trace. The nested traces may extend around approximately ⅔ or ¾ of the touchpad. The outer trace may be connected to an antenna feed at one end, while the inner trace is connected to ground at an opposite end. In some examples, neither of the touchpad or touchpad coupling or flex have a ground plane to reduce coupling to the touchpad and improve touchpad sensitivity. Instead, the inner grounded trace may be coupled to the outer trace to prevent the coupling from the touchpad and to improve tolerance and robustness of the antenna structure.

The second example antenna may also be positioned in a wearable device, such as an earbud. For example, it may be positioned near an edge of an outer surface of the earbud that is exposed when the earbud is placed inside a human ear. It may be positioned such that an opening, or an edge of the outer surface that does not include the antenna, is oriented upwards and to the left when the earbud is positioned in a right ear of the user. Such positioning reduces the body effect and detuning effect from the ear, while maximizing the antenna's efficiency. It also reduces the specific absorption rate (SAR).

Each of the first and second example antennas may be, for example, 2.4 GHz antennas. Each antenna is small enough and thin enough to fit inside an earbud, and is compatible with other components, such as a touchpad, PCB, etc. The antennas do not need larger ground plane to operate properly.

Example Systems

FIG. 1 illustrates a cross-section of an example wearable device, particularly an earbud 100. The earbud 100 includes a housing, which in this example include a bulb portion 102 and an extension portion 104. When worn by a user, extension portion 104 is inserted into the user's ear canal, such that the bulb portion rests within a cavity of the user's outer ear. In some examples, a top surface 106 of the housing may not extend beyond some parts of the outer ear, such as the pinna, earflap, or other portions. In other examples, the top surface 106 may extend only slightly beyond a plane including at least part of the user's outer ear. While the housing is shown as having a bulb portion 102, an extension portion 104, and a relatively flat top surface 106, it should be understood that various modifications may be made to a size and shape of the housing.

Inside the housing is a number of components that operate to receive signals from associated devices and emit sounds corresponding to the signals into the user's ear. For example, the earbud 100 may receive short range wireless audio signals from a mobile phone, music player, gaming device, or other electronic computing device. The earbud 100 may buffer the received signals and convert them into sound waves emitted through a speaker. Such reception, buffering, conversion, and emitting of signals requires a significant number of electronic components, though only some are described in detail herein. For example, battery 122 may supply power to various components, while speaker 124 emits sound. In some examples, the earbud 100 may further include a microphone or other device for capturing voice input from a user.

An upper portion 110 of the earbud 100 includes a touchpad 112, an antenna 140, and a circuit board and computer chip 116. The touchpad 112 may be used for receiving active user input. For example, a user may tap the touchpad to pause or play music, to switch the earbud 100 from a sound emitting mode to a voice input mode, to activate a pairing of the earbud 100 with other devices, or to perform any of a number of other functions. In some examples, touching or tapping the touchpad on different portions, for different durations of time, in different sequences, or in other distinct ways can be used to distinguish between a variety of desired user inputs. The touchpad 112 is positioned at an exposed surface of the earbud 100 for ease and convenience of access by a user's finger to enter input. For example, the touchpad 112 maybe inside or outside of the housing.

Inputs from the touchpad 112 may be provided to the computer chip 116 for performing the associated tasks. For example, the computer chip 116 may include a microprocessor or other hardware for detecting user input, identifying a function corresponding to the user input, and executing the function. In some examples, the computer chip 116 may be a Bluetooth chip. It may include a radio frequency (RF) signal source coupled to an antenna feed.

The antenna 140 is also positioned near a surface of the earbud that is exposed with respect to the user's ear when the earbud 100 is worn. For example, while sides of the bulb portion 102 may be in contact with portions of the user's ear when inserted, top surface 106 may be exposed to open air. This improves reception by the antenna 140 with less interference from body parts or earbud components. The antenna 140 may be inside or outside of the housing.

Figure 2A:
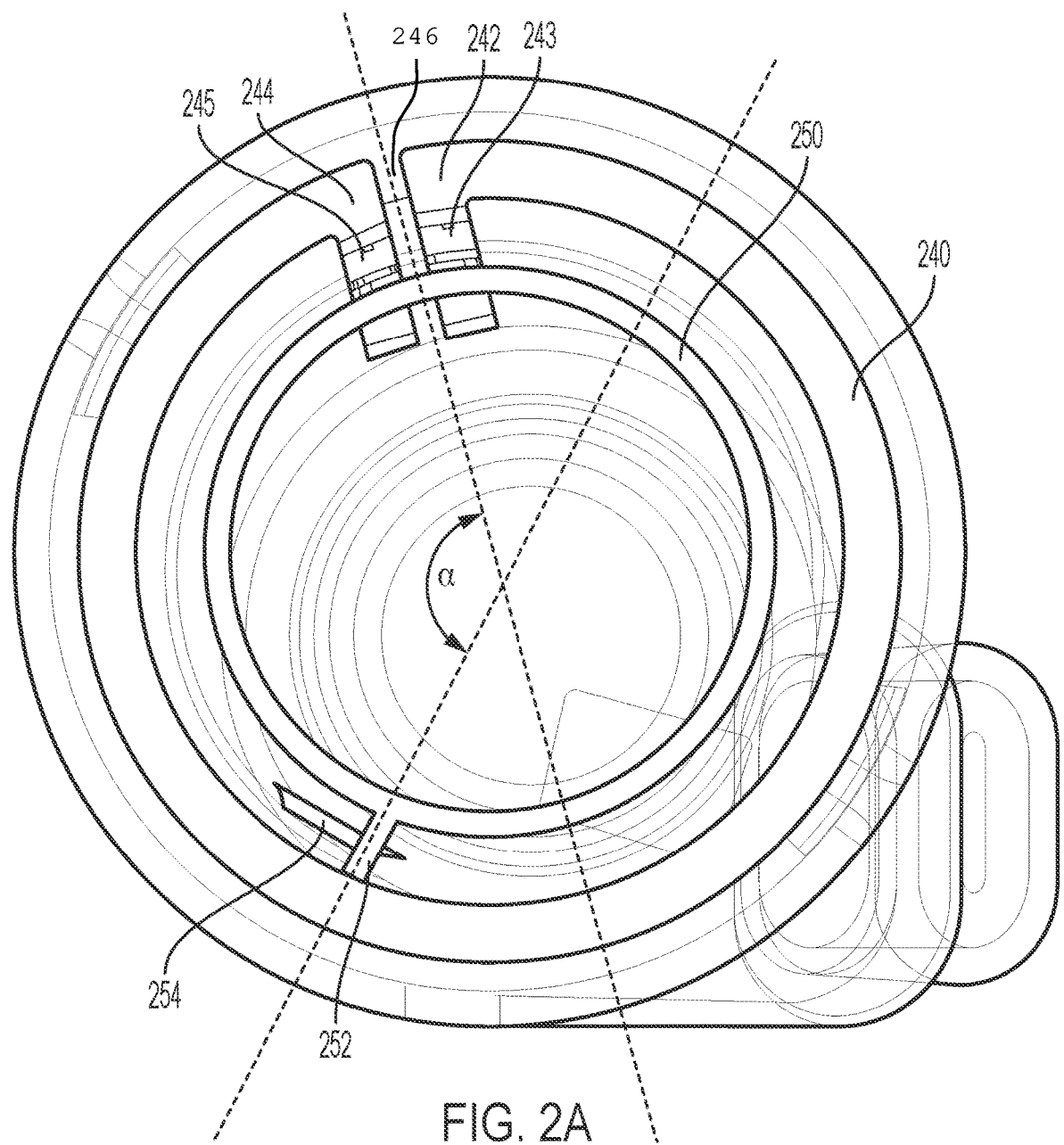
FIG. 2A is a top view of a first example antenna in accordance with aspects of the disclosure.

FIG. 2A provides a top view of a first example antenna 240, which extends substantially around a portion of the earbud, creating an outer loop. The antenna 240 may be formed of a trace of any of a variety of materials, such as copper or other metals. The antenna 240 includes a first end 242 and a second end 244. The first end 242 may be an antenna feed, while the second end 244 may be connected to ground. For example, the first and second ends 242, 244 of the antenna trace may be coupled to first and second connectors 243, 245, respectively. The connectors 243, 245 may be, for example, spring contacts that extend from the first and second ends 242, 244 towards an RF signal source on the computer chip or towards a ground.

The first end 242 and second end 244 may be in close proximity to one another. For example, a loop opening 246 created by a distance between the first end 242 and the second end 244 may be approximately 0.1-1.0 mm wide, or more or less. In one example implementation, the distance between the first end 242 and the second end 244 may be approximately 0.5 mm wide.

The second end 244 may be coupled to a ground trace 250. For example, the ground trace 250 may be an inner loop within the outer loop formed by the antenna 240. The ground trace 250 may serve as a ground for a touchpad sensor, as well as being part of the antenna 240. The ground trace 250 may be, for example, a length of material such as metal, dielectric, plasma, etc., that is shaped to form the inner loop. A length and width of the ground trace 250 are designed so that the antenna 240 will work at 2.44 GHz. The width and length can be used as a tuning knot, such that varying a length and width of the ground trace 250 will vary a frequency of the antenna 240. Moreover, a distance between the ground trace 250 and the antenna 240 The ground trace 250 may be a flexible metal, such as copper, and may work as an inductor.

The ground trace 250 may be connected to ground by, for example, a coupler 252 and extension 254. The coupler 252 and extension 254 may be made from the same materials as the antenna 240 and/or ground trace 250. The coupler 252 may be positioned in a location substantially opposite the loop opening 246, such as at an angle α between approximately 90 degrees and 180 degrees from the loop opening 246. For example, whereas the opening 246 is at a first position along a circumference of a top surface of the earbud, the coupler 252 may be located at a second position along the circumference that is approximately 90-180 degrees from the first position.

Figure 2B:
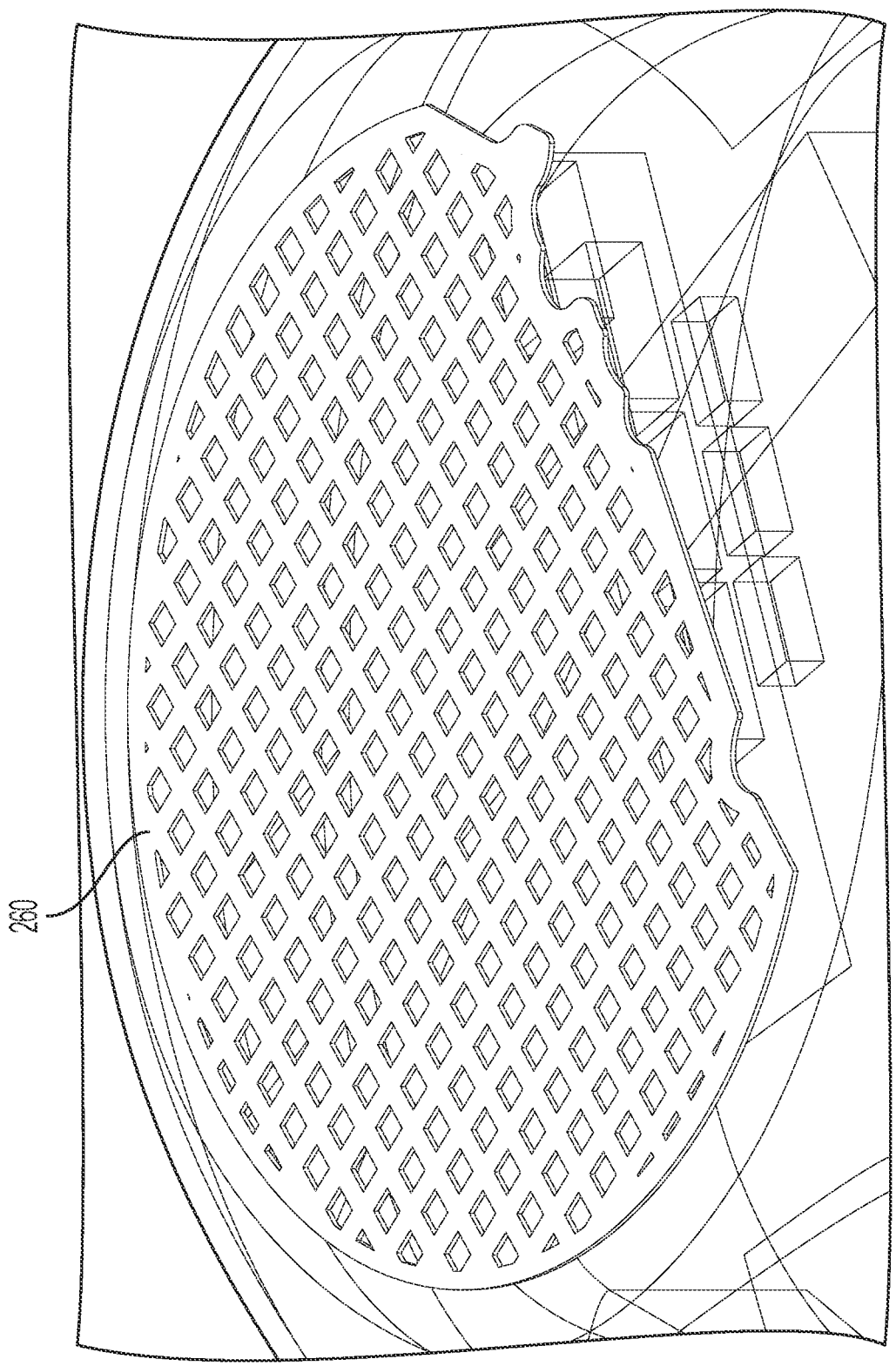
FIG. 2B is a perspective view of a ground plane of the first example antenna according to aspects of the disclosure.

In other examples, such as shown in FIG. 2B, the ground trace may be a ground plane 260. In the example of FIG. 2B, the ground plane 260 is a substantially circular plate having a crisscross pattern. This pattern may reduce coupling to a chip beneath the ground plane 260, thereby providing for better tolerance, efficiency, and bandwidth.

FIGS. 3A-3B illustrate different views of the first example antenna 240. As shown, antenna 240 substantially surrounds touchpad 212, such that the first end 242 serving as the antenna feed is in proximity to the second end 244 serving as ground. Coupler 252 couples the touchpad 212 to a printed circuit board 218. The coupler 252 is positioned in a location approximately opposite an opening between the first end 242 and second end 244. The coupler 252 may be made of a rigid or semi-rigid material, allowing for some movement of the touchpad 212 when pressed by a user's finger. Chip 216 resides on the PCB 218, while battery 222 and speaker 224 are positioned beneath.

Figure 4:
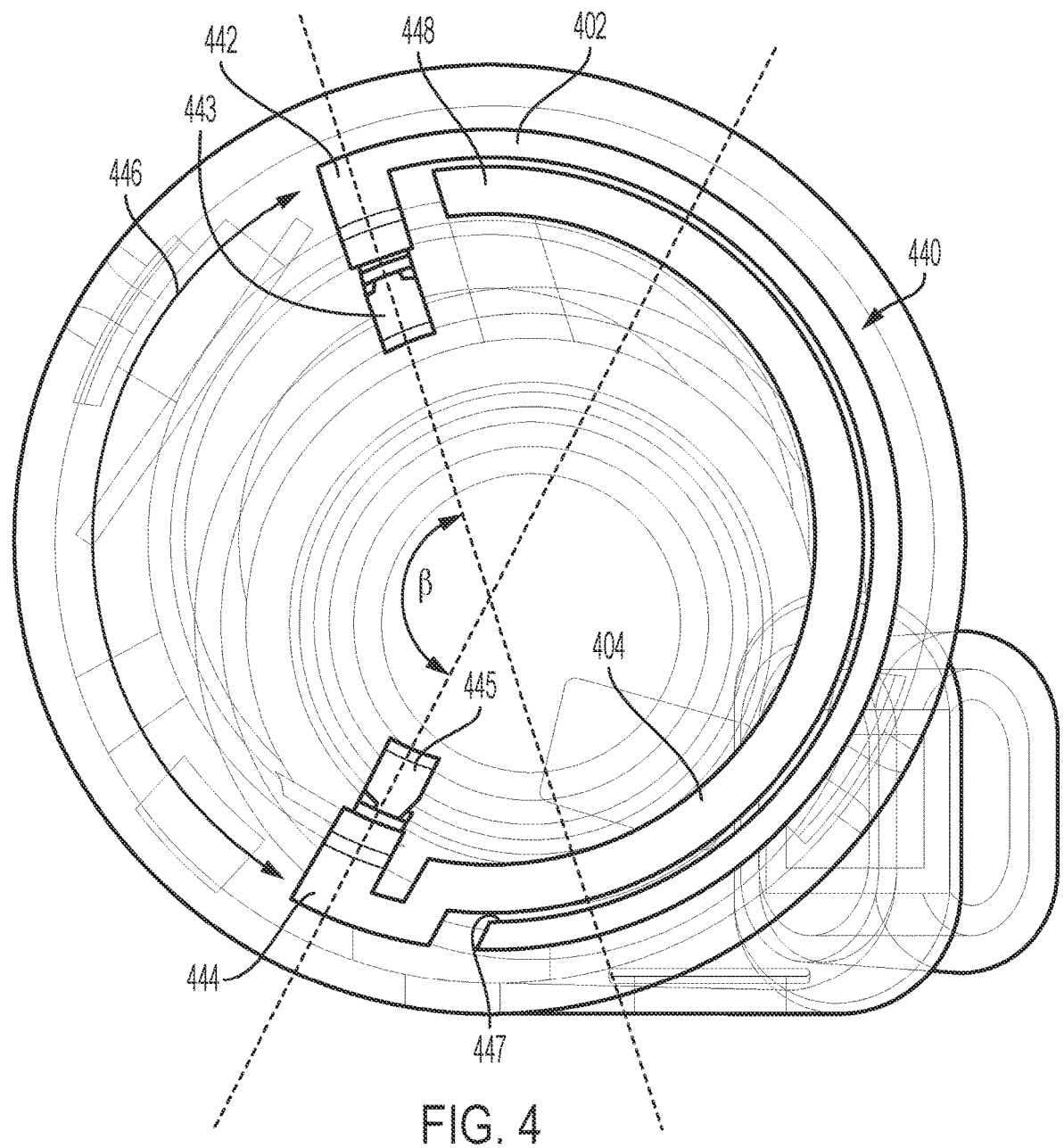
FIG. 4 is a top view of a second example antenna in accordance with aspects of the disclosure.

FIG. 4 illustrates a second example antenna 440. Rather than having an inner loop, such as the first example antenna of FIG. 2A, the second example antenna 440 includes two quarter-wavelength circular traces that extend around a portion of the touchpad. For example, a first trace 402 may have a second trace 404 nested therein, such that the first trace 402 is an outer trace and the second trace 404 is an inner trace. The nested traces may extend around approximately ⅔ or ¾ of the touchpad, by way of example. However, it should be understood that the traces 402, 404 may alternatively extend around more or less of the circumference of the earbud.

A first end 442 of the outer trace 402 is connected to an antenna feed, while a second end 446 447 of the outer trace 402 is untethered. For example, the first end 442 may be coupled to a first connector 443, such as a spring contact or other connector, which couples the first end 442 to an antenna feed. A first end 444 of the inner trace 404 is couple to ground, while a second end 448 of the inner trace 404 is untethered. For example, the first end 444 may be coupled to a second connector 445, such as a spring contact or other connector, which couples to ground. The first end 442 of the outer trace 402 may be oriented opposite the first end 444 of the inner trace 404. For example, the first end 442 of the outer trace 402 may be positioned near the second end 448 of the inner trace 404, while the first end 444 of the inner trace 404 is positioned near the second end 447 of the outer trace 402. As such, the first end 442 of the outer trace 402 and the first end 444 of the inner trace 404 may be at substantially opposing portions of a surface of the earbud.

An opening 446 between the first end 442 of the outer trace 402 that is coupled to the antenna feed and the first end 444 of the inner trace 404 that is coupled to ground may be larger than the opening 246 in the first example earbud of FIG. 2A. For example, the opening 446 of the second example antenna 440 may have an angle β of approximately between 90 degrees to 180 degrees, or the opening may include a portion of the earbud that is approximately ¼, ⅓, ½, or more or less of the circumference of the earbud.

A length and width of the first and second traces 402, 404 may determine a frequency of the antenna 440. For example, each trace 402, 404 may be approximately 30-50 mm long and 0.2-1.5 mm wide. Resulting frequencies of such traces 402, 404 may be, for example, 1-5 GHz.

The first and second traces 402, 404 may be positioned to avoid an ear of the user when the earbud is worn. For example, when the earbud is inserted in the user's ear, the first and second traces 402, 404 may extend around a portion of an exposed surface of the earbud that is towards the user's face, leaving the opening 446 towards an upper-back portion of the user's skull.

In contrast to the first example antenna 240, the second example antenna 440 is not coupled to a ground plane. A touchpad used with the second example antenna 440 also does not have a ground plane to reduce coupling to the touchpad and improve touchpad sensitivity. Instead, the inner grounded trace 404 may be coupled to the outer trace 402 to prevent the coupling from the touchpad and to improve tolerance and robustness of the antenna structure.

Figure 5B:
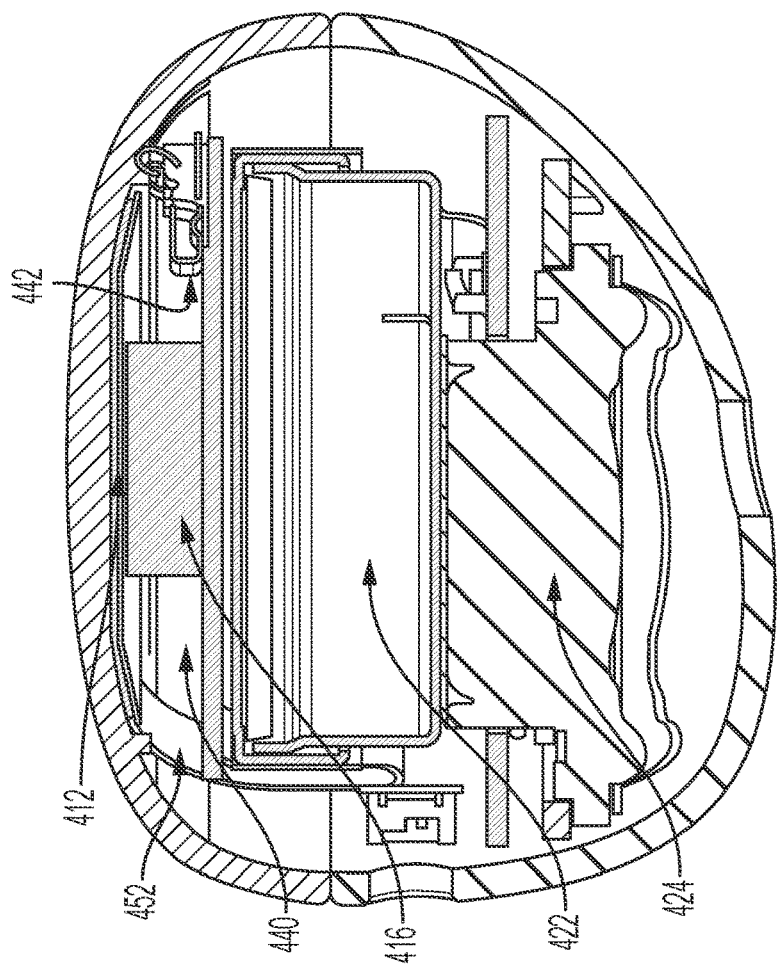
FIG. 5B is a cross-sectional view of an example earbud including the second example antenna.
Figure 5A:
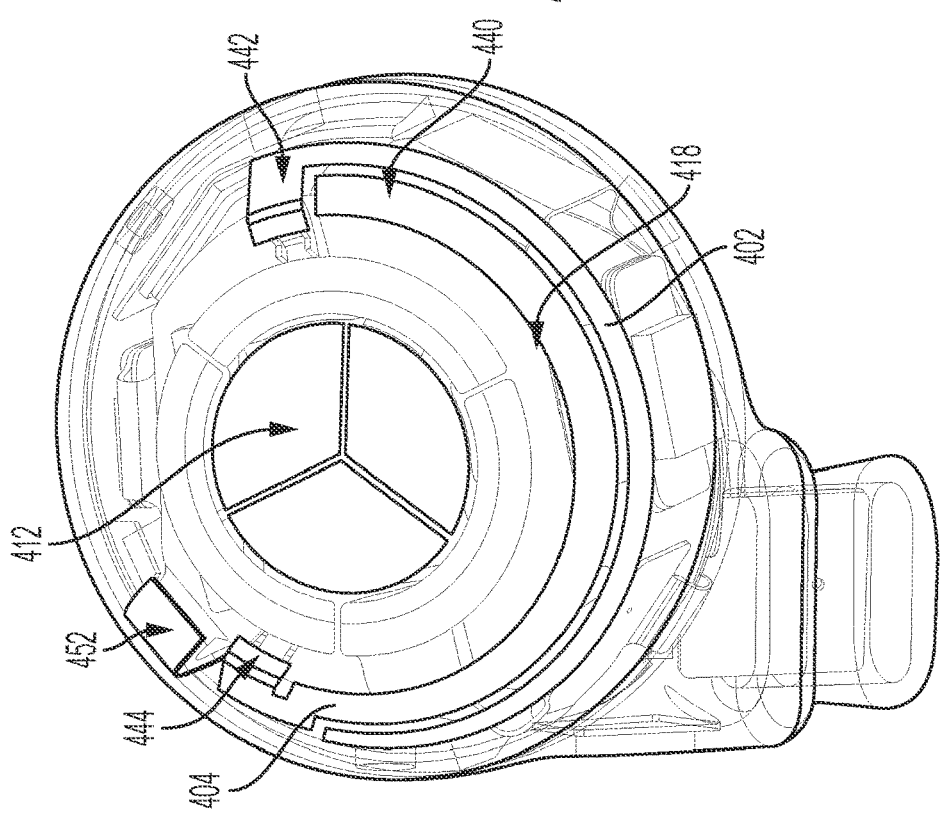
FIG. 5A is a perspective view of the second example antenna in accordance with aspects of the disclosure.

FIGS. 5A-5B illustrate the second example antenna 440 in relation to touchpad 412 and other components of the earbud. As shown in FIG. 5A, the second example antenna 440 includes outer trace 402 and nested inner trace 404. First end 442 of outer trace 402 is connected to an antenna feed, while first end 444 of the inner trace 404 is connected to ground. PCB 418 and chip 416 are positioned beneath the touchpad 412, and receive input from the touchpad 412. Touchpad coupling 452 is minimized by eliminating the ground plane of touchpad and the rigid coupling. Battery 422 may supply power to the components of the earbud, while speaker 424 is used to emit sounds. For example, as signals are received by the antenna 440, such as short range wireless signals (e.g., Bluetooth signals, etc.) from a paired electronic device, the signals may be converted to audio output by the speaker 424.

Figure 6:
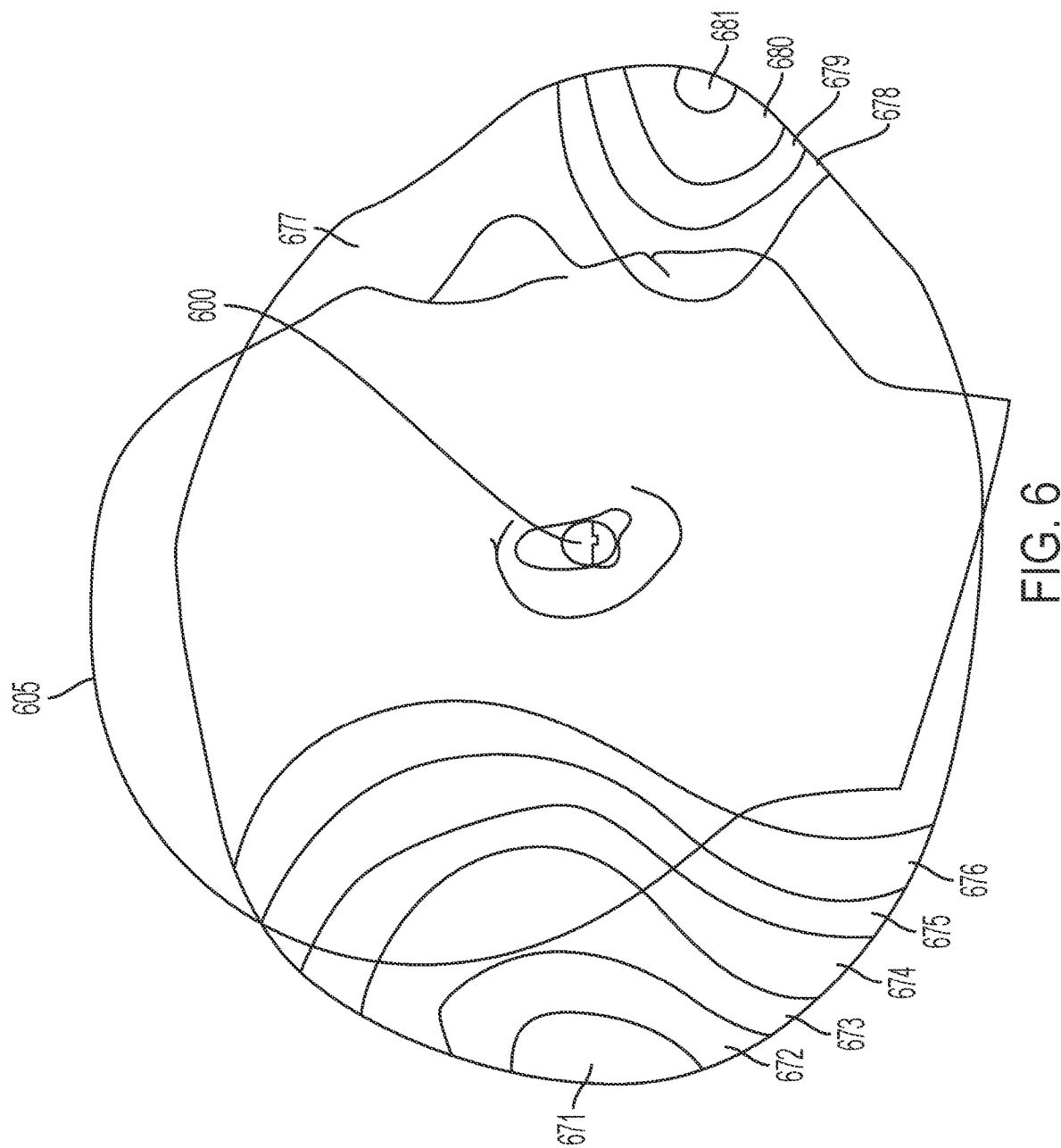
FIG. 6 illustrates an example radiation pattern for earbuds including the first or second example antenna in accordance with aspects of the disclosure.

FIG. 6 illustrates an example radiation pattern for earbuds including the first or second example antennas. As shown, user 605 is wearing an earbud 600 in his ear, the earbud 600 configured with one of the antenna described above in connection with FIGS. 2A-5B. Bands 671-681 depict various levels of gain from the antenna in directions forward and behind the antenna. For example, band 677 closest to the user's head may be in the range of approximately 0.5 dBi-2 dBi, while the bands further outwards progressively increase in dBi. For example, bands 675-676 and 678-679 may be approximately 1.5-2.5 dBi, bands 673-674 and 680-681 may be approximately 2-3 dBi, and bands 671-672 may be approximately 2.5-4 dBi. It should be understood that these are merely example ranges, and that actual energy levels may vary.

Figure 7:
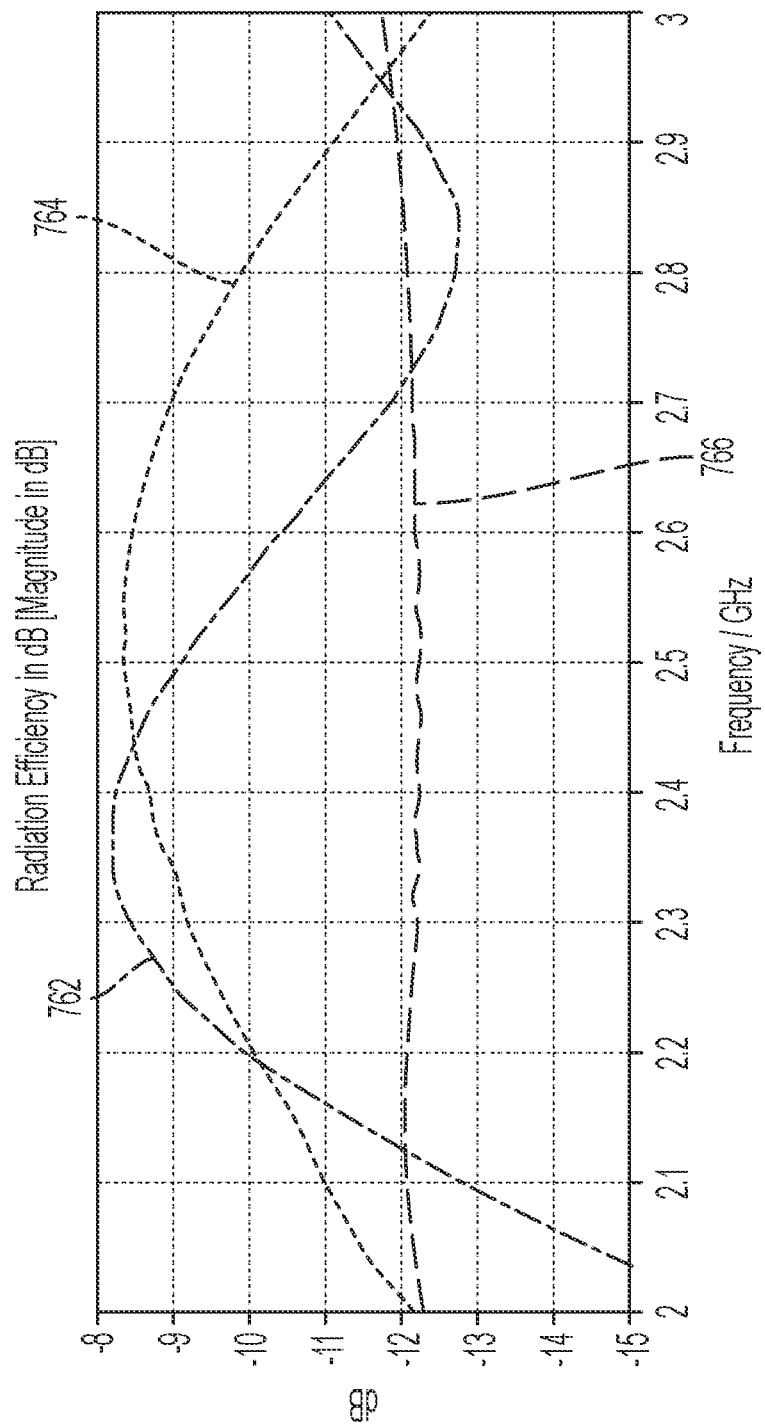
FIG. 7 is a graph comparing antenna performance of the first example antenna, the second example antenna, and a conventional antenna in accordance with aspects of the disclosure.

FIG. 7 is a graph comparing antenna performance of the first example antenna, the second example antenna, and a conventional antenna. For example, curve 762 indicates a radiation efficiency of the first example antenna, curve 764 indicates a radiation efficiency of the second example antenna, and curve 766 indicates a conventional antenna. As shown in this example, maximum efficiency of the first example antenna (curve 762) occurs at a frequency of approximately 2.3-2.4 GHz, and then efficiency drops as frequency increases. After a minimum efficiency at approximately 2.8 GHz, efficiency of the first example antenna represented by curve 762 increases again. Maximum efficiency of the second example antenna (curve 764) occurs at a frequency of approximately 2.5 GHz and then drops as frequency increases. Curve 766 indicating efficiency of a conventional antenna, in contrast to curves 762 and 764, remains at a relatively steady level.

The antennas described above provide for efficient operation of devices, particularly for small factor wearable electronic devices. Each antenna is small enough and thin enough to fit inside an earbud, and is compatible with other components, such as a touchpad, PCB, etc. The antennas do not need larger ground plane to operate properly. The antennas are arranged in the earbuds in a way to maximize a separation distance between the antenna and the user's ear, thereby reducing the body effect and specific absorption rate, while allowing for a relatively large antenna size. The antenna arrangement also largely avoids interference from a user's finger touching the earbud to provide input.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. An antenna, comprising:
    an outer trace extending partially around a portion of an earbud, the outer trace having a first end separated from a second end of the outer trace, the first end configured to serve as a feed for the antenna; and
    an inner trace nested with the outer trace and extending partially around the portion of the earbud, the inner trace having a second end coupled to ground;
    wherein the first end of the outer trace is positioned opposite the second end of the inner trace,
    wherein the first end of the inner trace terminates at the first end of the outer trace and the second end of the inner trace terminates at the second end of the outer trace,
    wherein the inner trace and the outer trace are curved,
    wherein there is an opening between the first end of the outer trace and the second end of the inner trace, the opening being between 90 degrees and 180 degrees, and the opening including no portion of the outer trace or the inner trace, and
    wherein when the earbud is positioned in a user's ear, the opening is oriented towards an upper back portion of the user's head.

2. The antenna of claim 1, wherein the inner trace and the outer trace are quarter wavelength traces.

3. The antenna of claim 1, wherein the inner trace and the outer trace extend around a touchpad near a surface of the earbud.

4. The antenna of claim 3, wherein the touchpad is not coupled to a ground plane.

5. The antenna of claim 3, wherein:
    the earbud has an exposed surface when inserted in the user's ear;
    the touchpad is positioned on the exposed surface; and
    the antenna is positioned near an edge of the exposed surface.

6. The antenna of claim 1, wherein the inner trace is nested with the outer trace and along a surface of the earbud.

7. The antenna of claim 6,
    wherein the inner trace has a first edge and a second edge opposite the first edge;
    the outer trace has a third edge opposite a fourth edge; and
    the second edge of the inner trace is nested with the third edge of the outer trace.

8. The antenna of claim 1, wherein the inner trace is concentrically layered with the outer trace.

9. An earbud, comprising:
- a housing, wherein at least one first surface of the housing is shaped to be positioned in a user's ear and at least one second surface of the housing is shaped to be exposed when the earbud is worn by the user;
- an input control at the at least one second surface of the housing; and
- an antenna at the at least one second surface of the housing, the antenna comprising:
  - an outer trace extending partially around the input control, the outer trace having a first end separated from a second end of the outer trace, the first end configured to serve as a feed for the antenna; and
  - an inner trace nested with the outer trace and extending partially around the input control, the inner trace having a second end coupled to ground,
  - wherein the first end of the outer trace is positioned opposite the second end of the inner trace,
  - wherein the first end of the inner trace terminates at the first end of the outer trace and the second end of the inner trace terminates at the second end of the outer trace,
  - wherein the inner trace and the outer trace are curved,
  - wherein there is an opening between the first end of the outer trace and the second end of the inner trace, the opening being between 90 degrees and 180 degrees, and the opening including no portion of the outer trace or the inner trace, and
  - wherein when the earbud is positioned in the user's ear, the opening is oriented towards an upper back portion of the user's head.

10. The earbud of claim 9, wherein the inner trace and the outer trace are quarter wavelength traces.

11. The earbud of claim 9, wherein the input control is a touchpad.

12. The earbud of claim 11, wherein the touchpad is not coupled to a ground plane.

13. The earbud of claim 9, wherein the inner trace is nested with the outer trace and along the at least one second surface of the earbud.

14. The earbud of claim 9, wherein the inner trace is concentrically layered with the outer trace.

* * * * *